(12) United States Patent
Reinecke et al.

(10) Patent No.: US 10,694,667 B2
(45) Date of Patent: Jun. 30, 2020

(54) SPREADER ARRANGEMENT WITH VERTICALLY PIVOTING SPREAD DEFLECTOR

(71) Applicant: CNH Industrial America LLC, New Holland, PA (US)

(72) Inventors: Clay A. Reinecke, Blue Grass, IA (US); Brett Gutknecht, Cedar Falls, IA (US); Justin L. Montenguise, Bettendorf, IA (US); Nicholas S. Shane, Bennett, IA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 0 days.

(21) Appl. No.: 14/749,012

(22) Filed: Jun. 24, 2015

(65) Prior Publication Data

US 2016/0374267 A1    Dec. 29, 2016

(51) Int. Cl.
*A01D 41/12* (2006.01)

(52) U.S. Cl.
CPC ................ *A01D 41/1243* (2013.01)

(58) Field of Classification Search
CPC ................................. A01D 41/1243
USPC ....... 239/1, 7, 650, 652, 653, 657, 661, 665, 239/666, 667, 679, 681, 682
See application file for complete search history.

(56) References Cited

U.S. PATENT DOCUMENTS

| | | | | |
|---|---|---|---|---|
| 3,539,113 A | * | 11/1970 | Tyler | A01C 17/001 239/667 |
| 4,763,844 A | * | 8/1988 | van der Lely | A01C 15/008 239/665 |
| 5,082,186 A | * | 1/1992 | Bruns | A01D 41/1243 239/667 |
| 5,203,510 A | * | 4/1993 | Courtney | A01C 17/006 239/667 |
| 5,797,793 A | | 8/1998 | Matousek et al. | |
| 6,027,052 A | * | 2/2000 | Strieker | A01D 87/10 239/654 |
| 6,209,808 B1 | * | 4/2001 | Anderson | A01C 17/006 239/666 |
| 6,238,286 B1 | | 5/2001 | Aubry et al. | |
| 6,517,281 B1 | * | 2/2003 | Rissi | E01C 19/203 239/659 |
| 6,572,035 B1 | * | 6/2003 | Pfeiffer | A01F 12/40 239/650 |
| 6,598,812 B1 | | 7/2003 | Matousek et al. | |

(Continued)

FOREIGN PATENT DOCUMENTS

EP    2042018 A1    4/2009
EP    2820937 A1    1/2015

OTHER PUBLICATIONS

European Search Report; 16175958.4-1655; dated Nov. 22, 2016.

*Primary Examiner* — Steven J Ganey
*Assistant Examiner* — Steven M Cernoch
(74) *Attorney, Agent, or Firm* — Patrick Sheldrake; Peter Zacharias

(57) ABSTRACT

A spreader arrangement for an agricultural harvester includes a frame, a pair of spreader discs carried by the frame, and a material deflector. The spreader discs are generally horizontally arranged and rotatable in a counter rotating manner. The material deflector includes at least one deflector arm and a vertical pivoting mechanism interconnecting the at least one deflector arm with the frame.

12 Claims, 4 Drawing Sheets

(56) References Cited

U.S. PATENT DOCUMENTS

| | | | |
|---|---|---|---|
| 6,939,221 B1 | 9/2005 | Redekop et al. | |
| 7,380,733 B2 * | 6/2008 | Owenby | A01C 7/122 239/656 |
| 7,553,227 B2 * | 6/2009 | Landuyt | A01D 41/1243 460/111 |
| 8,118,650 B2 | 2/2012 | Isaac et al. | |
| 8,821,230 B2 * | 9/2014 | Farley | A01F 12/30 460/111 |
| 2005/0258284 A1 * | 11/2005 | Magnusson | A01C 17/008 239/687 |
| 2007/0034721 A1 * | 2/2007 | Owenby | A01C 7/122 239/656 |
| 2009/0026284 A1 * | 1/2009 | Peeters | A01C 3/06 239/7 |
| 2014/0302897 A1 | 10/2014 | Isaac et al. | |

* cited by examiner

SPREADER ARRANGEMENT WITH VERTICALLY PIVOTING SPREAD DEFLECTOR

BACKGROUND OF THE INVENTION

1. Field of the Invention

The invention relates generally to agricultural equipment, such as harvesters, and more specifically, to spreader arrangements on such harvesters for spreading agricultural material to a field.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed, it falls through perforations in the concaves onto a grain pan. From the grain pan, the grain is cleaned using a cleaning system, and is then transported to a grain tank onboard the combine. A cleaning fan blows air through the sieves to discharge straw, chaff and other debris toward the rear of the combine.

During the process of harvesting, crop material other than grain is intended to be expelled from the combine. This material is usually derived from one of two areas, the threshing rotor or the cleaning system. The material expelled from the threshing rotor is generally referred to as straw and the material expelled from the cleaning system is generally referred to as chaff. This material or crop residue is typically dealt with by spreading or windrowing.

Spreading is accomplished using a mechanical device termed a spreader to distribute the straw and/or chaff substantially evenly from the rear of the combine. This spread material is usually chopped to as short a length as possible so that when it is spread it will break down as quickly as possible and not interfere with tillage or seeding operations.

Often, different field conditions require different apparatuses to spread the residue the full width of the head evenly. Many spreaders can adjust the speed of the spreading device to change the distance that material is spread. However, changing speed greatly affects the distribution of the spread. For instance, as the speed is slowed to spread to a narrower width, the material in the center increases without an adjustment point to change the distribution.

Conventional deflectors can be placed on the outside of the spreaders. These deflectors can pivot laterally to restrict the area in which that material can be spread, but they often cause an uneven spread. Moreover, material distribution fluctuates with the speed of the spreader. Some conventional designs incorporate a center mounted deflector that slides up and down to control the amount of material in the center of the spread while using deflectors in the center to influence the distance of the spread. Unfortunately, a sliding joint can also inadvertently accumulate crop material.

SUMMARY OF THE INVENTION

The present invention generally includes a set of deflectors mounted between and just rearward of two horizontal spreader discs on the rear of combine. Each of the left and right deflectors cover a portion of the left and right spreader disks, respectively. These defectors can be moved so that they are closer to the disk or further away to increase or decrease the distance material is spread. Each deflector is controlled to allow material to be spread to different lengths from the centerline on the left and right side of the machine or to account for cross wind. Additionally, the deflectors are pivotally mounted on the frame so that they can be rotated upwardly and downwardly away from the spreaders. When the deflectors are rotated upward (away from the spreaders), space is created in the middle of the spreaders allowing more material to be spread near the centerline of the vehicle. When the deflectors are rotated downward (closer to the spreaders), more material is forced to be spread wide and less material in the center.

The deflector assembly is mounted to a frame in the center of the spreader between and just rearward of the spreader disks. The deflector assembly can be manually adjustable or mechanically actuated. The deflector can pivot up and/or down from the mount on the spreader frame. Thus, the entire assembly pivots to let the operator determine how much of the deflector is in the flow of the material being spread. As the deflector is rotated further into the flow path, the more material is forced to be spread, leaving less at the center. The deflectors can also pivot laterally. The deflectors can be independently controlled and wrap a portion of the spreader disc starting in the center. Thus, deflectors can be moved closer or further from the disc to increase or decrease the spread distance.

The invention in one form is directed to a spreader arrangement for an agricultural harvester, including a frame, a pair of spreader discs carried by the frame, and a material deflector. The spreader discs are generally horizontally arranged and rotatable in a counter rotating manner. The material deflector includes at least one deflector arm and a vertical pivoting actuator interconnecting the at least one deflector arm with the frame.

An advantage of the present invention is that the material deflector may be pivoted vertically upwards or downwards, into or away from the flow of crop residue, to thereby alter the amount of crop residue that is distributed to the center of the combine.

Another advantage is that the vertical pivoting movement of the material deflector can offset for changes in the operational speed of the spreader discs.

BRIEF DESCRIPTION OF THE DRAWINGS

The present invention will be understood more fully from the detailed description given hereinafter and from the accompanying drawings of the preferred embodiment of the present invention, which, however, should not be taken to limit the invention, but are for explanation and understanding only.

Corresponding reference characters indicate corresponding parts throughout the several views. The exemplary embodiments set forth herein are not to be construed as limiting the scope of the invention in any manner.

DETAILED DESCRIPTION OF THE INVENTION

Figure 1:
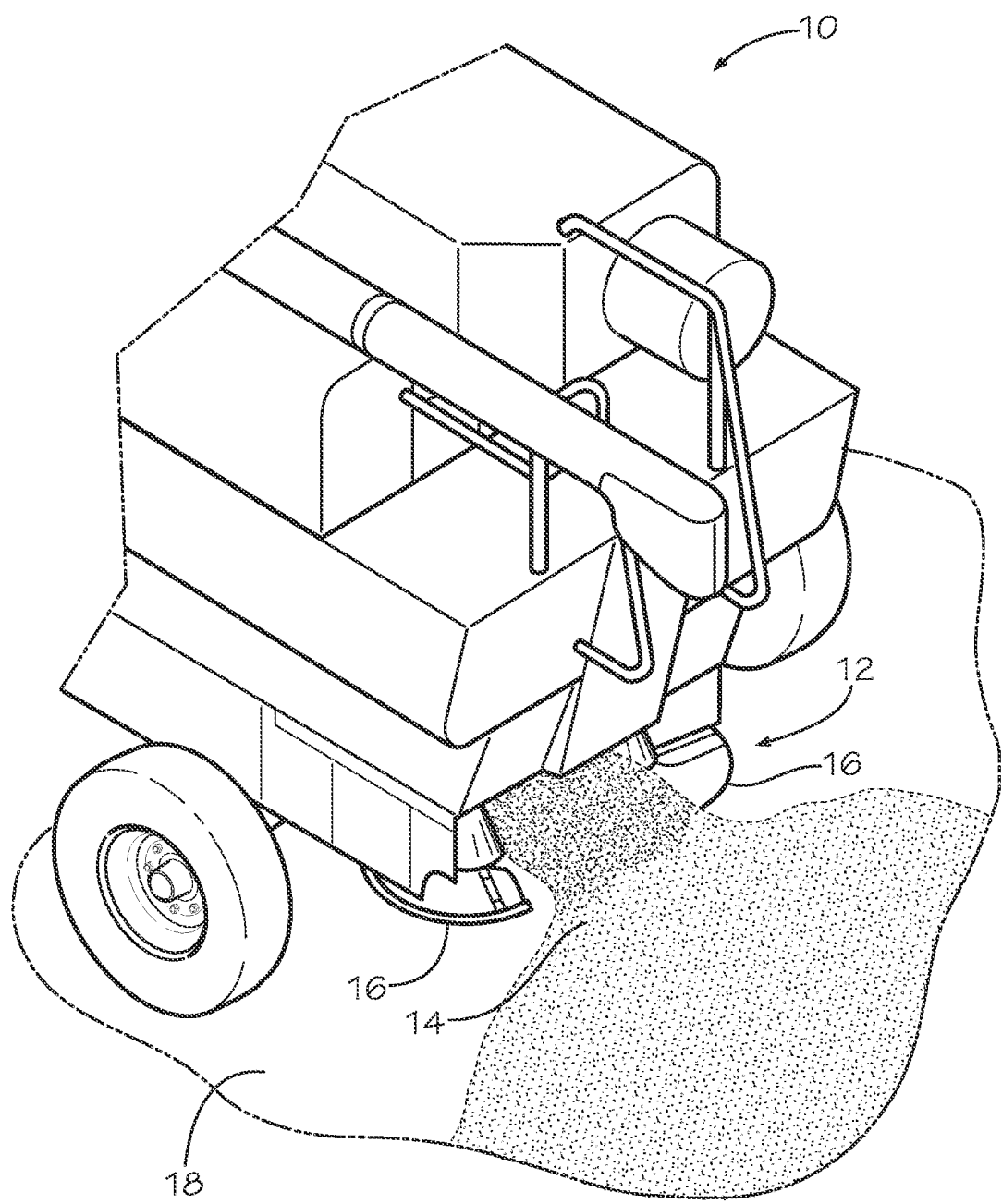
FIG. 1 shows a rear perspective view of a harvester which may include an embodiment of a spreader arrangement according to the present invention.
Figure 2:
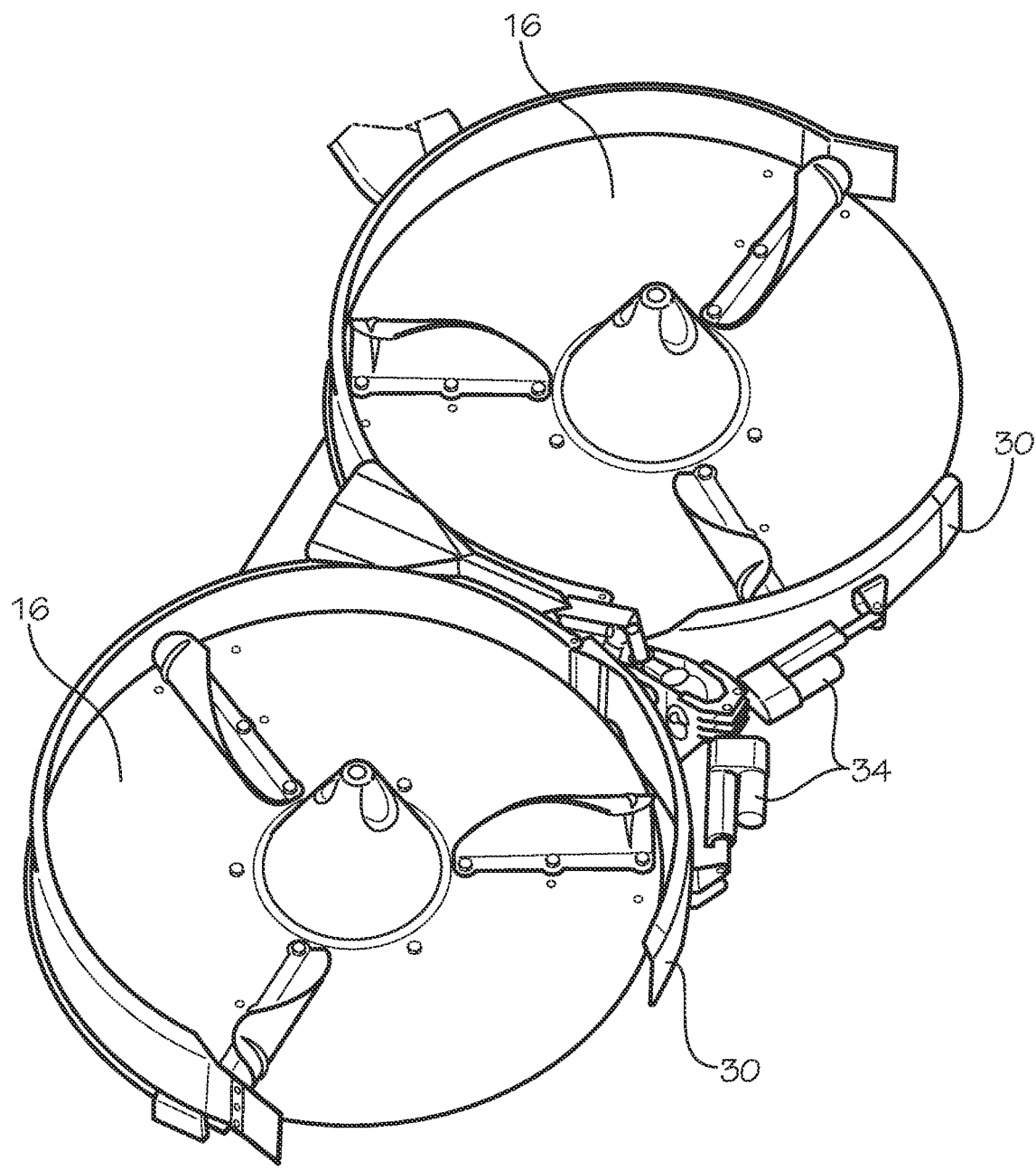
FIG. 2 shows a top perspective view of a spreader arrangement with a pivoting deflector according to the present invention, which may be used on the harvester of FIG. 1.

Referring now to the drawings, FIG. 1 is a rear perspective view of an embodiment of an agricultural harvester in the form of a combine harvester 10 with a chassis 11 which carries a spreader arrangement 12. The harvester 10 may harvest grains such as barley, corn, flax, oats, rye, soybeans, wheat, and so forth. Accordingly, the harvester 10 is configured to remove the desired portion of the plant and to separate the portion into different agricultural materials (e.g., grain, straw, and chaff). As discussed above, the harvester discharges this material after processing it. Some of the agricultural materials may be discharged from the rear of the harvester 10 using the spreader arrangement 12. For example, as shown in FIG. 1, the spreader arrangement 12 may direct crop residue 14 including straw and chaff into the spreader discs 16 to distribute the straw and chaff evenly over a field 18. Alternatively, the spreader arrangement 12 may distribute the straw and chaff in windrows behind the combine harvester 10.

Referring now to FIGS. 2-5, the spreader arrangement 12 generally includes a frame 20, a pair of spreader discs 16, and a material deflector 22. The spreader discs 16 are contained within frame 20 and are generally horizontally arranged relative to each other and rotatable in a counter rotating manner. A pair of drive motors 24 (FIGS. 3-5) are respectively positioned below each spreader disc 16. Each drive motor 24 rotatably drives one of the spreader discs 16. The drive motors 24 are shown as hydraulic motors, but can also be electric or pneumatic motors.

The spreader arrangement 12 can also include a pair of cones 26, with each cone 26 being generally concentrically positioned above a respective spreader disc 16. The cones 26 function to direct the crop residue in a radially outward direction toward the paddles 28 carried by each spreader disc 16.

The material deflector 22 is mounted on spreader arrangement 12 between the rotating spreader discs 16. The material deflector 22 generally includes one or more deflector arms 30, a vertical pivoting actuator 32, and at least one lateral pivoting actuator 34. Each deflector arm 24 wraps partially around a respective rotating disc 16, and is pivotally attached to the frame 20 of spreader apparatus 12 such that deflector arms 24 may move up and down relative to the spreader discs 16.

The lateral pivoting actuator 34 associated with each deflector arm 30 functions to selectively move the associated deflector arm 30 in lateral directions toward and away from the respective spreader disc 16. Each lateral pivoting actuator 34 may be a motorized remotely-engaged actuator, or may be manually actuated.

Figure 3:
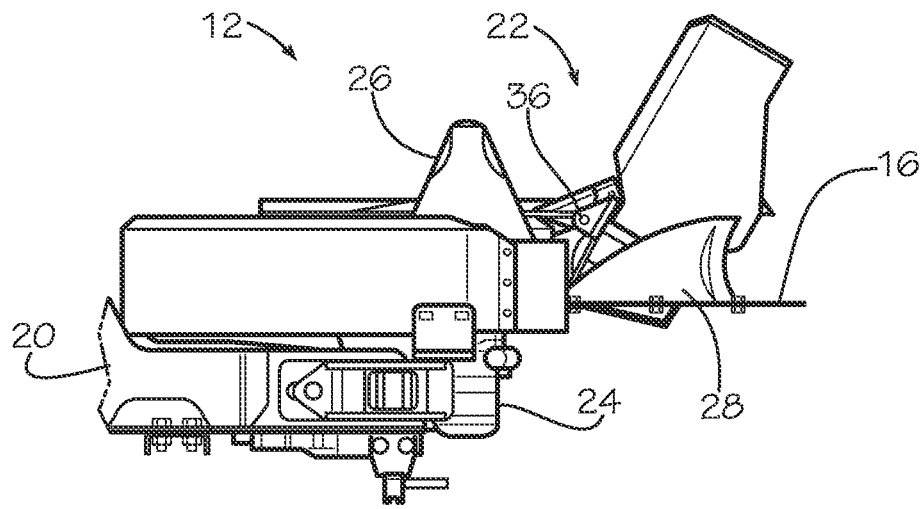
FIG. 3 shows a side view of the spreader arrangement shown in FIG. 2 with the deflector fully disengaged.
Figure 4:
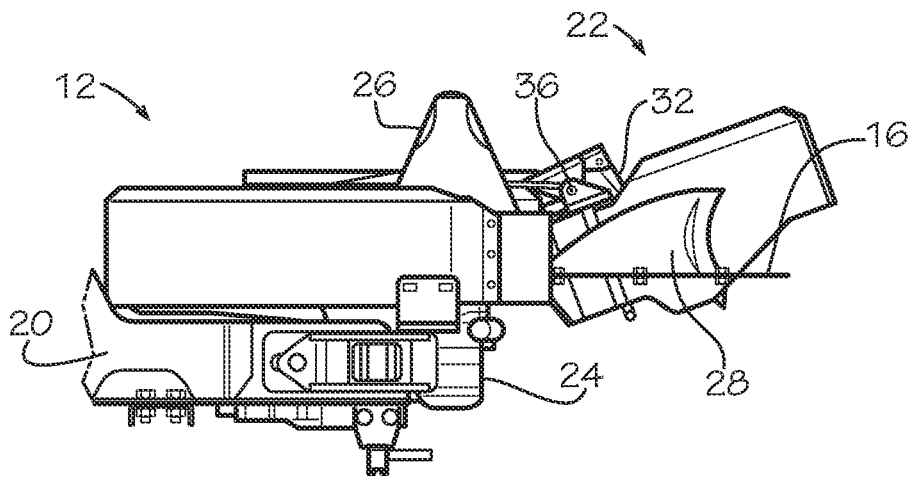
FIG. 4 shows a side view of the spreader arrangement shown in FIGS. 2 and 3, with the deflector partially engaged.
Figure 5:
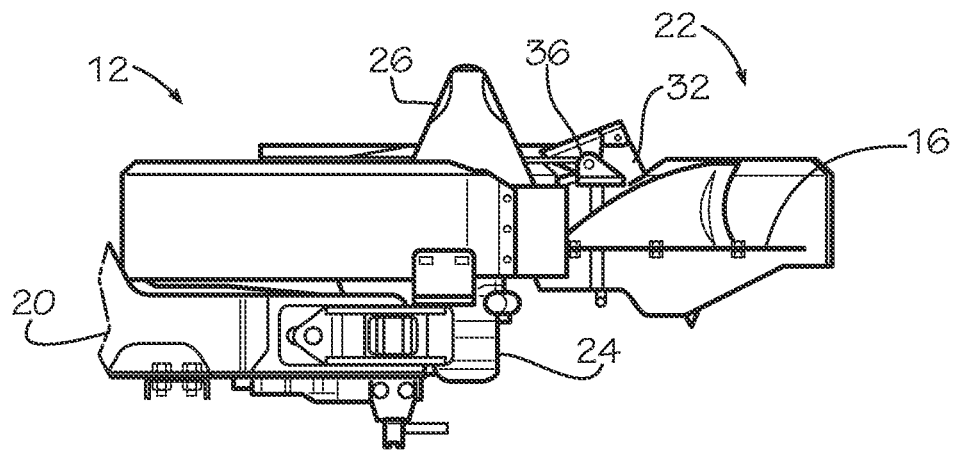
FIG. 5 shows a side view of the spreader arrangement shown in FIGS. 2-4, with the deflector fully engaged.

The vertical pivoting actuator 32 serves to pivotally rotate deflector arms 30 up or down relative to spreader discs 16, about a vertical pivoting mechanism 36 in the form of a simple hinge. As illustrated in FIGS. 3, 4 and 5 deflector arms 24 may be placed in a fully-disengaged position (FIG. 3), a partially-engaged position (FIG. 4), or a fully engaged position (FIG. 5). When the vertical pivoting actuator 32 is retracted, deflector arms 24 are pivoted upwardly relative to spreader 12 to thereby allow maximum material distribution in the center of spreader 12 (FIG. 3). When the vertical pivoting actuator 32 is partially retracted/extended, the deflector arms 30 are at a midway point between fully disengaged and fully engaged (FIG. 4). In this position, some material from spreader arrangement 12 is directed down to the ground in the center and other material is directed to be spread wider. When the vertical pivoting actuator 32 is fully extended, the deflector arms 30 are at a fully-engaged position with the crop residue such that minimum material is in the center of the spread distribution field (FIG. 5).

Figure 6:
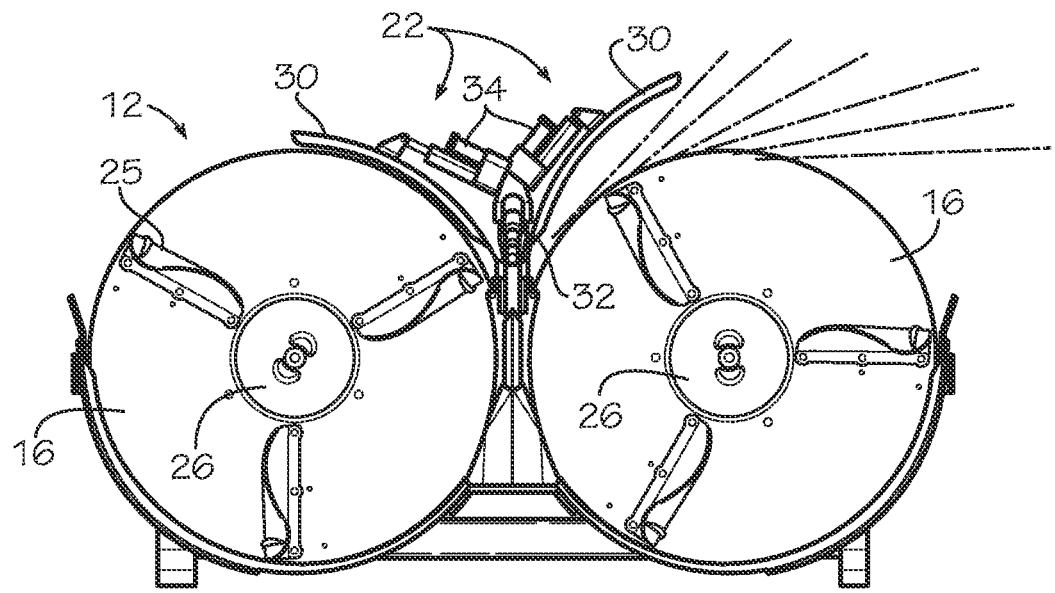
FIG. 6 shows a top view of the spreader arrangement shown in FIGS. 2-5, with the deflector laterally pivoted for a narrow spread distribution.
Figure 7:
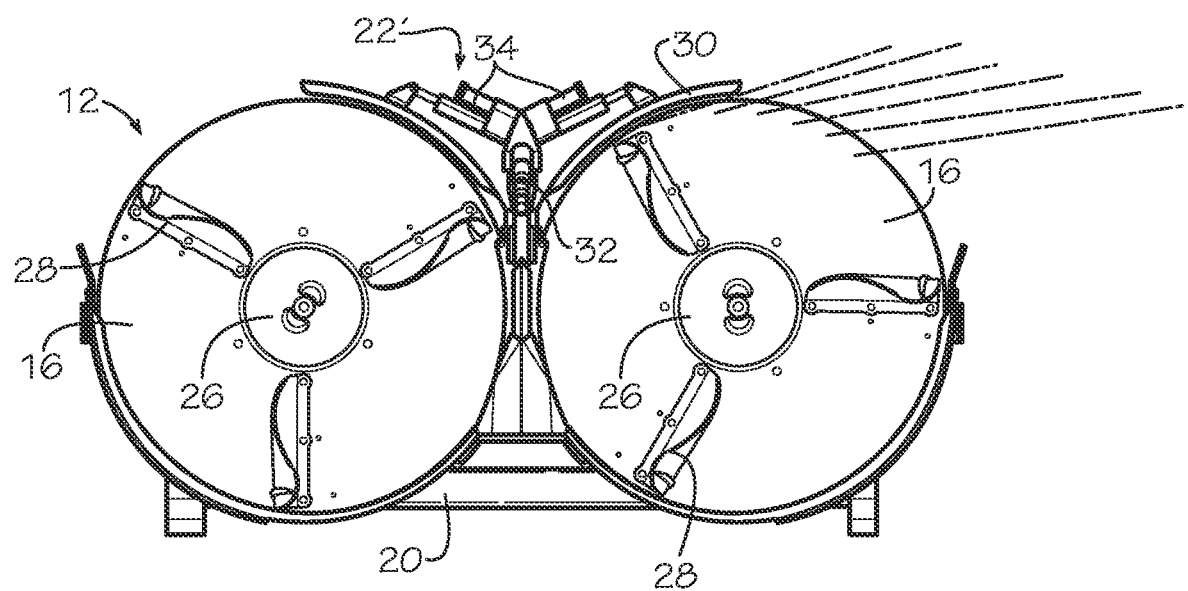
FIG. 7 shows a top view of the spreader arrangement of FIGS. 2-6, with the deflector laterally pivoted for a wide distribution.

As illustrated in FIG. 6, the lateral pivoting actuators mechanisms 26 are operatively connected to respective spreader arms 24 to selectively urge deflector arms 24 to pivot toward or away from discs 16 as desired. The more retracted deflector arms 24 are relative to discs 16, the narrower the spread distribution as illustrated in FIG. 6. However, as illustrated in FIG. 7, when deflector arms 24 are positioned more closely to disc 16, a wider spread distribution of material is achieved.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A spreader arrangement for an agricultural harvester, the spreader arrangement comprising:

a frame;

a pair of spreader discs carried by said frame, said spreader discs each having a horizontally extending upper surface and a plurality of paddles located above the upper surface, the spreader discs arranged and rotatable in a counter rotating manner; and a material deflector associated with at least one spreader disc of said pair of spreader discs, said material deflector including:

a pivotal connector connected to the frame and defining a horizontal axis;

a pair of laterally pivotal deflector arms, each said laterally pivotal deflector arm being associated with a respective spreader disc, and being pivotal about a respective vertical axis such that each said laterally pivotal deflector arm is laterally pivotal toward and away from said respective spreader disc of said pair of spreader discs, and said laterally pivotal deflector arms are mounted to the pivotal connector such that each said laterally pivotal deflector arm is upwardly and downwardly pivotable relative to said respective spreader disc of said pair of spreader discs; and an actuator operably coupled to the frame, and configured for pivoting said laterally pivotal deflector arms upwardly or downwardly relative to said spreader discs about the horizontal axis;

the pivotal connector is rotatable to allow said laterally pivotal deflector arms to pivot about said horizontal axis between an operative position wherein said laterally pivotal deflector arms may be interposed within a flow of crop residue which is discharged from said spreader discs, and an inoperative position wherein a majority of said laterally pivotal deflector arms are located above the plurality of paddles and not interposed within a flow of crop residue which is discharged from said spreader discs; and wherein the actuator is configured such that a height of the laterally pivotal deflector arms can be adjusted separately from the lateral position of the laterally pivotal deflector arms.

2. The spreader arrangement of claim 1, wherein:
said pivotal connector is pivotally attached to said frame between said spreader discs.

3. The spreader arrangement of claim 1, wherein:
said pivotal connector is further configured to allow said laterally pivotal deflector arms to pivot about said horizontal axis to an intermediate operative position wherein said laterally pivotal deflector arms are partially interposed within said flow of crop residue which is discharged from said spreader discs.

4. The spreader arrangement of claim 1, wherein:
said laterally pivotal deflector arms being arcuate and being laterally pivotal to at least one position concentric with said respective spreader disc.

5. An agricultural harvester, comprising:
a chassis; and
a spreader arrangement carried by said chassis at a rear of the chassis, said spreader arrangement including:
  a frame;
  a pair of spreader discs carried by said frame, said spreader discs each having a horizontally extending upper surface and a plurality of paddles located above the upper surface, the spreader discs arranged and rotatable in a counter rotating manner; and
  a material deflector associated with at least one spreader disc of said pair of spreader discs, said material deflector including:
    a pivotal connector connected to the frame and defining a horizontal axis;
    a pair of laterally pivotal deflector arms positioned laterally adjacent to the pair of spreader discs, each said laterally pivotal deflector arm being associated with a respective spreader disc, and being pivotal about a respective vertical axis such that each said laterally pivotal deflector arm is laterally pivotal toward and away from said respective spreader disc of said pair of spreader discs, and said laterally pivotal deflector arms are attached to said pivotal connector which interconnects both of said laterally pivotal deflector arms with said frame such that each said laterally pivotal deflector arm is upwardly and downwardly pivotable relative to said respective spreader disc of said pair of spreader discs; and
    an actuator operably coupled to the frame and to the pivotal connector, and configured for rotating the pivotal connector for pivoting said laterally pivotal deflector arms upwardly or downwardly relative to said spreader discs about the horizontal axis wherein the actuator is configured such that a height of the laterally pivotal deflector arms can be adjusted separately from the lateral position of the laterally pivotal deflector arms.

6. The agricultural harvester of claim 5, wherein:
said pivotal connector is configured to allow said laterally pivotal deflector arms to pivot about said horizontal axis between a lower operative position wherein said laterally pivotal deflector arms may be interposed within a flow of crop residue which is discharged from said spreader discs, and an upper inoperative position wherein a majority of said laterally pivotal deflector arms are located above the plurality of paddles and not interposed within a flow of crop residue which is discharged from said spreader discs.

7. The agricultural harvester of claim 6, wherein:
said pivotal connector is further configured to allow said laterally pivotal deflector arms to pivot about said horizontal axis to an intermediate operative position wherein said laterally pivotal deflector arms are partially interposed within said flow of crop residue which is discharged from said spreader discs.

8. The agricultural harvester of claim 5, wherein:
said pivotal connector is configured to be manually or automatically vertically adjustable.

9. The agricultural harvester of claim 5, wherein:
said laterally pivotal deflector arms being arcuate and being laterally pivotal to at least one position concentric with said respective spreader disc.

10. The agricultural harvester of claim 5, wherein:
said pivotal connector is pivotally attached to said frame between said spreader discs.

11. A method of operating an agricultural combine, comprising:
providing a spreader arrangement comprising a frame, a pair of spreader discs carried by said frame, said spreader discs each having a horizontally extending upper surface and a plurality of paddles located above the upper surface, the spreader discs arranged and rotatable in a counter rotating manner, and a material deflector associated with at least one spreader disc of said pair of spreader discs, said material deflector comprising a pivotal connector pivotally connected to the frame and defining a horizontal axis, a pair of laterally pivotal deflector arms, each said laterally pivotal deflector arm being associated with a respective spreader disc, and being pivotal about a respective vertical axis such that each said laterally pivotal deflector arm is laterally pivotal toward and away from said respective spreader disc of said pair of spreader discs, and said laterally pivotal deflector arms are mounted to the pivotal connector such that each said laterally pivotal deflector arm is upwardly and downwardly pivotable relative to said respective spreader disc of said pair of spreader discs, and an actuator operably coupled to the frame and to the pivotal connector;
upwardly pivoting the pivotal connector, by the actuator, about the horizontal axis such that a residue contacting portion of the deflector arms are raised above a lateral face of the spreader discs to an upper inoperative position wherein each said laterally pivotal deflector arm is not interposed within a flow of crop residue which is discharged from said spreader discs; and
downwardly pivoting the pivotal connector, by the actuator, to a lower operative position wherein each said laterally pivotal deflector arm may be interposed within a flow of crop residue which is discharged from said spreader discs.

12. The method of claim 11, wherein:
said lateral pivotal deflector arms are further pivotal about said horizontal axis to an intermediate operative position wherein said laterally pivotal deflector arms are partially interposed within said flow of crop residue which is discharged from said spreader discs.

* * * * *